United States Patent [19]

Schmidhauser

[11] Patent Number: 5,663,275
[45] Date of Patent: Sep. 2, 1997

[54] PREPARATION OF POLYETHER POLYMERS USING BISPHENOL HYDRATE AS INTERMEDIATE

[75] Inventor: John Christopher Schmidhauser, Niskayuna, N.Y.

[73] Assignee: General Electric Company, Schenectady, N.Y.

[21] Appl. No.: 676,014

[22] Filed: Jul. 5, 1996

[51] Int. Cl.⁶ .............................. C08G 73/10; C08G 8/02
[52] U.S. Cl. ............................................ 528/125; 528/170
[58] Field of Search ........................................ 528/125, 170

[56] References Cited

U.S. PATENT DOCUMENTS

| | | | |
|---|---|---|---|
| 4,056,511 | 11/1977 | Staniland | 525/125 |
| 4,105,635 | 8/1978 | Freeman | 528/126 |
| 4,492,806 | 1/1985 | Mendiratta et al. | 568/723 |
| 4,546,207 | 10/1985 | Mendiratta et al. | 568/723 |
| 4,950,729 | 8/1990 | Daniels | 528/126 |
| 5,229,482 | 7/1993 | Brunelle | 528/125 |
| 5,235,020 | 8/1993 | Savariar | 528/125 |
| 5,239,043 | 8/1993 | Savariar | 528/125 |

*Primary Examiner*—Jeffrey C. Mullis
*Attorney, Agent, or Firm*—William H. Pittman

[57] ABSTRACT

Aromatic polyether polymers, illustrated by polyethersulfones, polyetherketones and polyetherimides, are prepared by a phase transfer catalyzed reaction between a hydrate of a salt of a dihydroxyaromatic compound and a substituted aromatic compound such as bis(4-hydroxyphenyl) sulfone, bis(4-hydroxyphenyl) ketone or 1,3-bis[N-(4-chlorophthalimido)]benzene. Isolation of the hydrate and its conversion to the anhydrous salt prior to the polymerization reaction affords a polymer of higher molecular weight than other methods of preparing the anhydrous salt.

16 Claims, No Drawings

PREPARATION OF POLYETHER POLYMERS USING BISPHENOL HYDRATE AS INTERMEDIATE

BACKGROUND OF THE INVENTION

This invention relates to the preparation of polyether polymers, and particularly polymers with very high molecular weight.

Various types of aromatic polyethers, particularly polyethersulfones, polyetherketones and polyetherimides, have become important as engineering resins by reason of their excellent properties. These polymers are typically prepared by the reaction of salts of dihydroxyaromatic compounds, such as bisphenol A disodium salt, with dihaloaromatic molecules such as bis(4-fluorophenyl) sulfone, bis(4-chlorophenyl) sulfone, the analogous ketones and halo- or nitro-substituted bis(phthalimides).

In particular, U.S. Pat. No. 5,229,482 describes a method for preparing polyether polymers by reactions conducted in substantially non-polar solvents such as o-dichlorobenzene, dichlorotoluene, 1,2,4-trichlorobenzene and diphenyl sulfone. Said reaction is conducted at a temperature in the range of about 125°–250° C. in the presence of a phase transfer catalyst which is stable at such temperatures. Various hexaalkylguanidinium salts are disclosed as being particularly useful as phase transfer catalysts under these conditions.

To maximize yield and molecular weight of the polyether polymer, it is important that the bisphenol salt be anhydrous at the time of reaction. Anhydrous bisphenol salts are typically prepared in an aqueous medium by reaction of the bisphenol with a stoichiometric amount of sodium hydroxide, followed by removal of water by azeotropic distillation in the presence of a suitable organic solvent such as toluene, xylene or chlorobenzene.

Because it is difficult to maintain precisely stoichiometric conditions, the anhydrous salt frequently contains measurable proportions of unreacted sodium hydroxide or unconverted bisphenol. These impurities may have adverse affects. For example, unreacted sodium hydroxide can absorb carbon dioxide, as can aqueous solutions of bisphenol sodium salts upon storage in prolonged contact with air.

U.S. Pat. No. 4,546,207 discloses a method for separating a bisphenol salt from an aqueous solution, frequently in the form of its hydrate. According to said patent, the hydrate is capable of use in certain displacement reactions after removal of water.

SUMMARY OF THE INVENTION

The present invention is based on the discovery that polyether polymers of comparatively high molecular weight can be prepared by the initial isolation of a hydrate of a dihydroxyaromatic compound salt, followed by conversion of the hydrate to the anhydrous salt and reaction with a disubstituted aromatic compound from a specific genus. The high molecular weight polymer is obtainable even after storage of the hydrate in contact with air for prolonged periods of time.

The invention, therefore, is a method for preparing an aromatic polyether polymer which comprises:

neutralizing said dihydroxyaromatic compound with an alkali metal hydroxide in an aqueous medium, and removing water to form a hydrate of the bis-alkali metal salt of said dihydroxyaromatic compound;

converting said hydrate to the corresponding anhydrous alkali metal salt; and contacting, in a non-polar solvent and at a temperature in the range of about 125°–250° C., said anhydrous salt with at least one substituted aromatic compound of the formula $$Z(A^1-X^1)_2, \qquad (I)$$

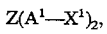

wherein Z is an activating radical, $A^1$ is an aromatic radical and $X^1$ is fluoro, chloro, bromo or nitro, in the presence of a catalytically active amount of a phase transfer catalyst which is substantially stable at the temperatures employed.

DETAILED DESCRIPTION; PREFERRED EMBODIMENTS

The alkali metal salts of dihydroxy-substituted aromatic hydrocarbons which are employed in the present invention are typically sodium and potassium salts. Sodium salts are frequently preferred by reason of their availability and relatively low cost.

Suitable dihydroxy-substituted aromatic hydrocarbons include those having the formula $$HO-A^2-OH, \qquad (II)$$

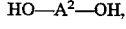

wherein $A^2$ is a divalent aromatic hydrocarbon radical. Suitable $A^2$ radicals include m-phenylene, p-phenylene, 4,4'-biphenylene, 4,4'-bis(3,5-dimethyl)phenylene, 2,2-bis(4-phenylene)propane and similar radicals such as those which correspond to the dihydroxy-substituted aromatic hydrocarbons disclosed by name or formula (generic or specific) in U.S. Pat. No. 4,217,438.

The $A^2$ radical preferably has the formula $$-A^3-Y-A^4-, \qquad (III)$$

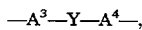

wherein each of $A^3$ and $A^4$ is a monocyclic divalent aromatic hydrocarbon radical and Y is a bridging hydrocarbon radical in which one or two atoms separate $A^3$ from $A^4$. The free valence bonds in formula III are usually in the meta or para positions of $A^3$ and $A^4$ in relation to Y. Compounds in which $A^2$ has formula I are bisphenols, and for the sake of brevity the term "bisphenol" is sometimes used herein to designate the dihydroxy-substituted aromatic hydrocarbons; it should be understood, however, that non-bisphenol compounds of this type may also be employed as appropriate.

In formula III, the $A^3$ and $A^4$ values may be unsubstituted phenylene or hydrocarbon-substituted derivatives thereof, illustrative substituents (one or more) being alkyl and alkenyl. Unsubstituted phenylene radicals are preferred. Both $A^3$ and $A^4$ are preferably p-phenylene, although both may be o- or m-phenylene or one o- or m-phenylene and the other p-phenylene.

The bridging radical, Y, is one in which one or two atoms, preferably one, separate $A^3$ from $A^4$. Illustrative radicals of this type are methylene, cyclohexylmethylene, 2-[2.2.1]-bicycloheptylmethylene, ethylene, isopropylidene, neopentylidene, cyclohexylidene, cyclopentadecylidene, cyclododecylidene and adamantylidene; gem-alkylene (alkylidene) radicals are preferred. Also included, however, are unsaturated radicals. For reasons of availability and particular suitability for the purposes of this invention, the preferred radical of formula III is the 2,2-bis(4-phenylene) propane radical, which is derived from hisphenol A and in which Y is isopropylidene and $A^3$ and $A^4$ are each p-phenylene.

Spiro(bis)indane bisphenols may also be employed. They include 6,6'-dihydroxy-3,3,3',3'-tetramethylspiro(bis)indane and its substituted analogs.

The substituted aromatic compounds of formula I which are employed in the present invention contain an aromatic radical $A^1$ and an activating radical Z. The $A^1$ radical is normally a di- or polyvalent $C_{6-10}$ radical, preferably monocyclic and preferably free from electron-withdrawing substituents other than Z. Unsubstituted $C_6$ aromatic radicals are especially preferred.

The Z radical is usually an electron-withdrawing group, which may be di- or polyvalent to correspond with the valence of $A^1$. Examples of divalent radicals are carbonyl, carbonylbis(arylene), sulfone, bis(arylene) sulfone, benzo-1,2-diazine and azoxy. Thus, the moiety —$A^1$—Z—$A^1$— may be a bis(arylene) sulfone, bis(arylene) ketone, bis(arylene)benzo-1,2-diazine or bis(arylene)azoxy radical and especially one in which $A^1$ is p-phenylene.

Also included, and often preferred, are compounds in which —$A^1$—Z—$A^1$— is a bisimide radical, illustrated by those of the formula

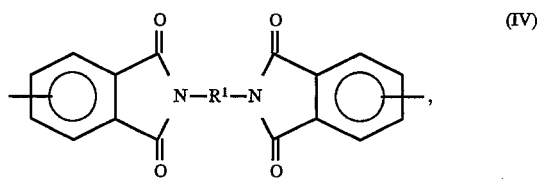
(IV)

wherein $R^1$ is a $C_{6-20}$ divalent aromatic hydrocarbon or halogenated hydrocarbon radical, a $C_{2-20}$ alkylene or cycloalkylene radical, a $C_{2-8}$ bis(alkylene-terminated) polydiorganosiloxane radical or a divalent radical of the formula

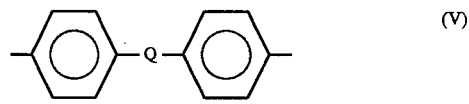
(V)

in which Q is —$C_2H_4$—, —O—, —CO—, —$SO_2$—, —$C(CF_3)_2$— or a covalent bond. Most often, $R^1$ is at least one of m-phenylene, p-phenylene, 4,4'-oxybis (phenylene) and

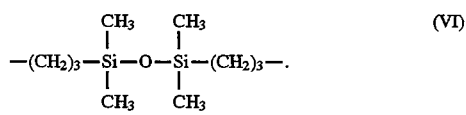
(VI)

Polyvalent Z radicals include those which, with $A^1$, form part of a fused ring system such as benzimidazole, benzoxazole, quinoxaline or benzofuran.

Also present in the substituted aromatic compound of formula I are two displaceable $X^1$ radicals which may be fluoro, chloro, bromo or nitro. In most instances, fluoro and chloro atoms are preferred by reason of the relative availability and effectiveness of the compounds containing them.

Among the particularly preferred substituted aromatic compounds of formula I are bis(4-fluorophenyl) sulfone and the corresponding chloro compound; bis(4-fluorophenyl) ketone and the corresponding chloro compound; 1,3-bis[N-(4-fluorophthalimido)]benzene, also designated 2,2'-(1,3-phenylene)-bis[5-fluoro-1H-isoindole-1,3-(2H-dione)], the corresponding 1-4-bis compound and 4,4'-bis[N-(4-fluorophthalimido)]phenyl ether, and the corresponding chloro, bromo and nitro compounds.

In the first step of the method of this invention, the bisphenol alkali metal salt is prepared by neutralization of the bisphenol in an aqueous medium. Neutralization may be achieved by contacting bisphenol with alkali metal hydroxide in at least a 2:1 molar ratio, preferably a 2.2–2.5:1 molar ratio. Neutralization is typically achieved at a temperature in the range of about 50°–100° C.

Following neutralization, water is removed from the hydrate (hexahydrate in the case of bisphenol A) by conventional means which may include such operations as crystallization and evaporation of water. It is important to remove essentially all excess sodium hydroxide from the hydrate. Typically, the aqueous solution of the bisphenol salt is cooled to cause the hydrate to crystallize, after which the hydrate may be removed by filtration and washed with water. It may then be dried by gas sparging until a constant weight is achieved. Preferably, all of these operations are conducted in an inert gas atmosphere such as nitrogen. While the hydrate may be stored in an inert atmosphere, this is not required and high molecular weight polyether polymers may be obtained from hexahydrate even after storage in contact with air.

In the second step, the hydrate is converted to the anhydrous salt. This is typically done by azeotropic distillation, using an organic liquid which forms an azeotrope with water. Examples of such liquids are toluene, xylene and o-dichlorobenzene. Conversion may also be effected by such operations as oven drying and fluidized bed drying.

In the final step, the anhydrous bisphenol salt undergoes reaction with the substituted aromatic compound. Said reaction is conducted in a non-polar solvent, preferably one having a boiling point above about 150° C. in order to facilitate the reaction which requires temperatures in the range of about 125°–250° C. Suitable solvents of this type include o-dichlorobenzene, dichlorotoluene, 1,2,4-trichlorobenzene and diphenyl sulfone. Solvents of similar polarity but lower boiling points, such as chlorobenzene, may be employed at superatmospheric pressures.

Also present in the reaction mixture is a phase transfer catalyst which is substantially stable at temperatures in the range of about 125°–250° C. Various types of phase transfer catalysts may be employed for this purpose. They include quaternary phosphonium salts of the type disclosed in U.S. Pat. No. 4,273,712; N-alkyl-4-dialkylaminopyridinium salts of the type disclosed in U.S. Pat. Nos. 4,460,778 and 4,595,760, and guanidinium salts of the type disclosed in the aforementioned U.S. Pat. No. 5,229,482. Said patents and application are incorporated by reference herein.

The preferred phase transfer catalysts, by reason of their exceptional stability at high temperatures and their effectiveness to produce high molecular weight aromatic polyether polymers in high yield are the hexaalkylguanidinium and α,ω-bis (pentaalkylguanidinium)alkane salts. For the sake of brevity, both types of salts are hereinafter sometimes designated "guanidinium salt".

Suitable guanidinium salts are represented by the formula

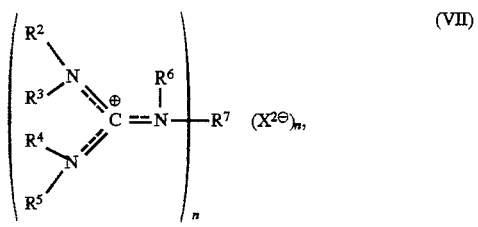

wherein:
  each of $R^2$, $R^3$, $R^4$, $R^5$ and $R^6$ is a primary alkyl radical and $R^7$ is a primary alkyl or bis(primary alkylene) radical, or at least one of the $R^2$–$R^3$, $R^4$–$R^5$ and $R6$–$R^7$ combinations with the connecting nitrogen atom forms a heterocyclic radical;
  $R^2$ is an anion; and
  n is 1 or 2.

The alkyl radicals suitable as $R^{2-6}$ include primary alkyl radicals, generally containing about 1–12 carbon atoms. $R^7$ is usually an alkyl radical of the same structure or a $C_{2-12}$ alkylene radical in which the terminal carbons are primary; most preferably, it is $C_{2-6}$ alkyl or $C_{4-8}$ straight chain alkylene. Alternatively, any combination of $R^{2-7}$ and the corresponding nitrogen atom(s) may form a heterocyclic radical such as piperidino, pyrrolo or morpholino.

The α,ω-bis(pentaalkylguanidinium)alkane salts defined when $R^7$ is alkylene and n is 2 are disclosed in U.S. Pat. No. 5,081,298.

The $X^2$ value may be any anion and is preferably an anion of a strong acid; examples are chloride, bromide and methanesulfonate. Chloride and bromide ions are usually preferred. The value of n will be 1 or 2 depending on whether $R^7$ is alkyl or alkylene.

As indicated by the dotted bonds in formula VII, the positive charge in the guanidinium salt is delocalized over one carbon and three nitrogen atoms. This is believed to contribute to the salts stability under the relatively high temperature conditions encountered according to the invention. As a result, decomposition of the guanidinium salt does not occur or occurs only to a very minor extent. The results include suppression of by-product formation and potential for continued use via recycle.

Hexaalkylguanidinium salts may be prepared by the reaction of a corresponding urea (e.g., a tetraalkylurea) with phosgene or phosphor-us oxychloride, or by the reaction of a similar thiourea with an N,N-dialkylcarbamoyl halide, to yield a chloroformamidinium salt, frequently referred to as a "Vilsmeier salt", followed by reaction of said salt with a corresponding amine (e.g., a dialkylamine). Reference is made to Kantlehner et al., *Liebigs Ann. Chem.*, 1984, 108–126, and Pruszynski, *Can. J. Chem.*, 65, 626–629 (1987), which are incorporated by reference herein. α,ω-Bis(pentaalkylguanidinium)alkane salts may be similarly prepared by reaction of the chloroformamidinium salt with a monoalkylamine, followed by reaction of the resulting pentaalkylguanidinium salt with an alkylene dihalide.

The bisphenol salt and substituted aromatic compound are brought into contact in substantially equimolar amounts. For maximum molecular weight, the amounts should be as close as possible to exactly equimolar, but molecular weight control may be achieved by employing one reagent or the other in slight excess. It is also within the scope of the invention to employ monofunctional reagents such as monohydroxyaromatic compounds or monohalo- or nitroaromatic compounds as chain termination agents.

Reaction temperatures are in the range of about 125°–250° C., preferably about 130°–225° C. The proportion of phase transfer catalyst employed is generally about 0.5–10 and preferably about 1–5 mole percent based on hisphenol salt.

Following completion of the reaction, the aromatic polyether polymer may be isolated by conventional methods. This typically includes the steps of washing and precipitation by combination of the polymer solution with a non-solvent for the polymer.

As previously noted, the method of this invention which employs the hydrate of the hisphenol salt produces polymers having a substantially higher molecular weight than previously disclosed methods in which said salt is The invention is illustrated by the following examples.

EXAMPLE 1

Bisphenol A, 70 g (307 mmol), was added to a solution of 56.5 g (706 mmol) of 50% (by weight) aqueous sodium hydroxide solution in 40 ml of nitrogen-sparged water. The resulting mixture was stirred in a nitrogen atmosphere for 4 hours at 85° C. It was then cooled to 20° C., whereupon a crystalline solid precipitated. The solid was filtered in a nitrogen atmosphere and washed with 30 ml of nitrogen-sparged water. Excess water was removed at room temperature by passing a stream of nitrogen over the solid until a constant weight of 62.3 g was attained. The product, the desired hisphenol A disodium salt hexahydrate, was stored under nitrogen.

EXAMPLE 2

A mixture of 50 ml of o-dichlorobenzene and 3.0661 g (8.06 mmol) of the product of Example 1 was heated under nitrogen at 200° C. to distill off the water of hydration along with about 20 ml of o-dichlorobenzene. A mixture of 10 ml of o-dichlorobenzene and 3.524 g (8.06 mmol) of 1,3-bis [N-(4-chlorophthalimido)]benzene was then added and distillation was continued until an addition 10 ml of o-dichlorobenzene had been removed. There was then added 115 mg (0.037 mmol) of hexaethylguanidinium bromide. The mixture was stirred at 200° C. under nitrogen and samples were removed periodically and analyzed for molecular weight by gel permeation chromatography.

EXAMPLE 3

Bisphenol A disodium salt hexahydrate was exposed to air for 16 hours, after which the procedure of Example 2 was followed.

The molecular weights of the polyetherimide samples obtained according to Examples 2 and 3 were compared with controls obtained from bisphenol A disodium salt prepared by the reaction of 87.6 mmol of bisphenol A with 175.2 mmol of sodium hydroxide, followed by azeotropic removal of water by distillation with toluene to obtain an anhydrous salt. The results are given in the following table.

| Polyetherimide prepn. method | Polymerization time, hrs. | Weight average mol. wt. Invention | Weight average mol. wt. Control |
|---|---|---|---|
| Ex. 2 | 1 | 35,800 | 28,300 |
|  | 2 | 52,600 | 40,700 |
|  | 3 | 87,000 | 61,100 |
| Ex. 3 | 1 | 30,000 | 7,500 |
|  | 2 | 56,700 | 11,400 |
|  | 3 | 112,500 | 15,400 |

It is apparent that the method of this invention consistently affords polyetherimide of higher molecular weight than the control. The difference in molecular weight is particularly evident for the polymers made by the method of Example 3, which included storage of the bisphenol A salt in air.

What is claimed is:

1. A method for preparing an aromatic polyetherimide which comprises:

neutralizing a dihydroxyaromatic compound with an alkali metal hydroxide in an aqueous medium, removing water to form a hydrate of the bis-alkali metal salt of said dihydroxyaromatic compound, and isolating said hydrate in crystalline form;

converting said hydrate to the corresponding anhydrous alkali metal salt; and contacting, in a non-polar solvent and at a temperature in the range of about 125°–250° C., said anhydrous salt with at least one substituted aromatic compound of the formula $$Z(A^1\text{—}X^1)_2, \qquad (I)$$

wherein:

Z is an activating radical, $A^1$—Z—$A^1$— is a bisimide radical of the formula

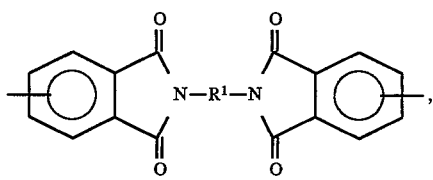

(IV)

wherein $R^1$ is a $C_{6-20}$ divalent aromatic hydrocarbon or halogenated hydrocarbon radical, a $C_{2-20}$ alkylene or cycloalkylene radical, a $C_{2-8}$ bis(alkylene-terminated) polydiorganosiloxane radical or a divalent radical of the formula

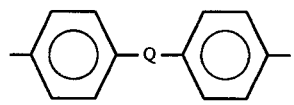

(V)

in which Q is —$C_2H_4$—, —O—, —CO—, —$SO_2$—, —$C(CF_3)_2$— or a covalent bond; and $X^1$ is fluoro, chloro, bromo or nitro, in the presence of a catalytically active amount of a phase transfer catalyst which is substantially stable at the temperatures employed.

2. A method according to claim 1 wherein removal of water is by azeotropic distillation.

3. A method according to claim 1 wherein the solvent is o-dichlorobenzene, 1,2,4-trichlorobenzene or diphenyl sulfone.

4. A method according to claim 3 wherein the phase transfer catalyst is a quaternary phosphonium salt, an alkylaminopyridinium salt or a guanidinium salt of the formula

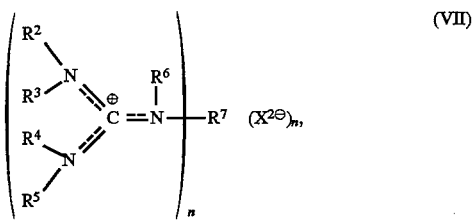

(VII)

wherein:

each of $R^2$, $R^3$, $R^4$, $R^5$ and $R^6$ is a primary alkyl radical and $R^7$ is a primary alkyl or bis(primary alkylene) radical, or at least one of the $R^2$-$R^3$, $R^4$-$R^5$ and $R^6$-$R^7$ combinations with the connecting nitrogen atom forms a heterocyclic radical;

$X^2$ is an anion; and n is 1 or 2.

5. A method according to claim 4 wherein $A^1$ is a di- or polyvalent monocyclic $C_{6-10}$ radical free from electron-withdrawing substituents other than Z.

6. A method according to claim 5 wherein the dihydroxyaromatic compound has the formula HO—$A^3$—Y—$A^4$—OH, wherein each of $A^3$ and $A^4$ is a monocyclic divalent aromatic hydrocarbon radical and Y is a bridging hydrocarbon radical in which one or two atoms separate $A^3$ from $A^4$.

7. A method according to claim 6 wherein $A^1$ is p-phenylene.

8. A method according to claim 7 wherein Z is a sulfone radical.

9. A method according to claim 7 wherein Z is a carbonyl radical.

10. A method according to claim 6 wherein $X^1$ is fluoro or chloro.

11. A method according to claim 6 wherein the hydrate is bisphenol A disodium salt hexahydrate.

12. A method according to claim 11 wherein the solvent is o-dichlorobenzene.

13. A method according to claim 6 wherein the phase transfer catalyst is a guanidinium salt of formula VII.

14. A method according to claim 13 wherein the proportion of phase transfer catalyst employed is about 1–5 mole percent based on the dihydroxy-substituted aromatic hydrocarbon salt.

15. A method according to claim 14 wherein the guanidinium salt is hexaethylguanidinium chloride.

16. A method according to claim 14 wherein the guanidinium salt is hexaethylguanidinium bromide.

* * * * *